Nov. 6, 1928.

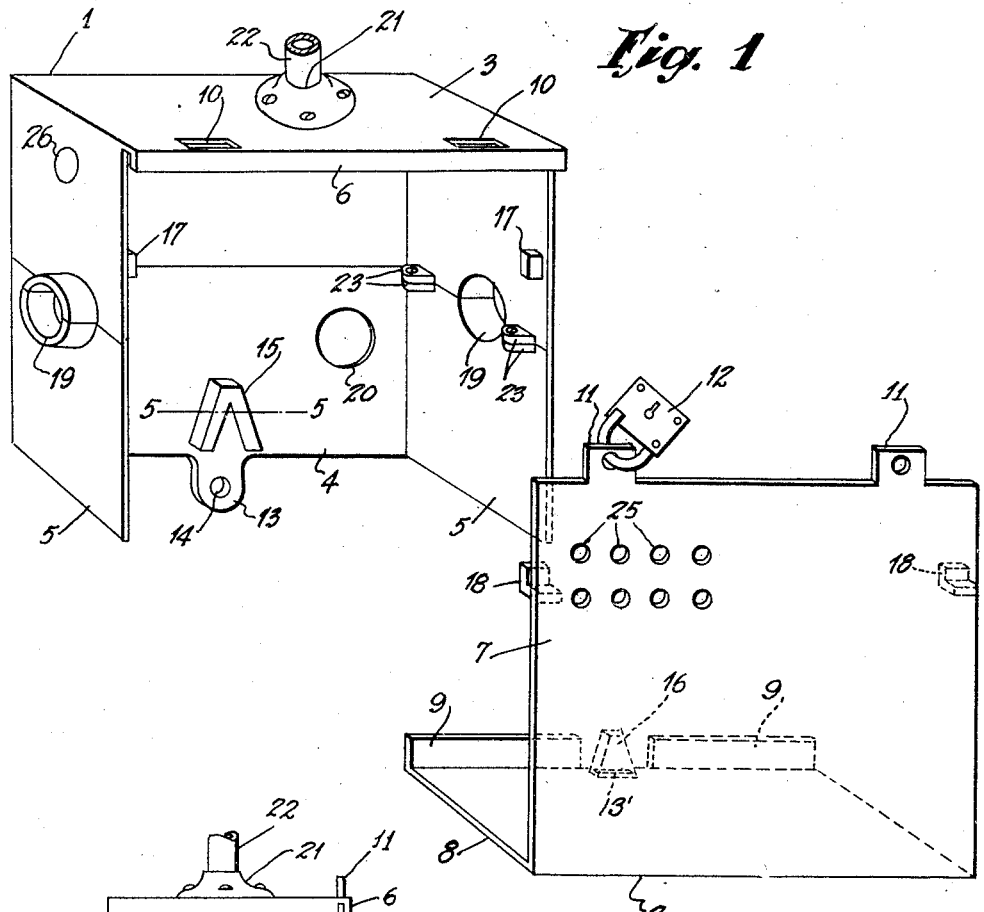

H. SIEBEN 1,690,461

VALVE HOUSING

Filed May 9, 1927

INVENTOR.
Henry Sieben
BY Cornelius Zabriskie
ATTORNEYS.

Patented Nov. 6, 1928.

1,690,461

UNITED STATES PATENT OFFICE.

HENRY SIEBEN, OF NEW YORK, N. Y.

VALVE HOUSING.

Application filed May 9, 1927. Serial No. 189,865.

This invention relates to valve housings and more particularly to the housings adapted to be associated with automatic and manual gas shut-off valves. Valves of the character referred to are generally provided with operating mechanism positioned exteriorly of the valve casing and cooperating with the valve stem in such manner that in the event of fire the operating mechanism is caused to function for the purpose of closing the valve. This mechanism, moreover, is manually operable generally from the pull box arranged exteriorly of the associated building.

The housings to which I have referred are commonly employed to enclose the operating mechanism positioned exteriorly of the valve casing. In some instances, the housing also encloses the valve while in other cases the valve is positioned exteriorly of the housing. In either event, it is impossible that this operating mechanism be properly housed and protected so that unauthorized persons cannot tamper with it and also to properly protect it against accumulations of dirt or foreign matter which might interfere with its proper operation in the event of an emergency.

It has been the general practice to construct housings of the character described of sheet metal and provide such housings with a removable cover which might be readily removed by any one. These housings have furthermore been so constructed that even if it were attempted to lock them in closed position, they can be readily bent or distorted slightly to allow of their removal from the body of the housing. Furthermore, in many instances, it has been essential to install the housing at the time of making the original installation. Otherwise, it was necessary to remove the gas connections from the valve in order to complete the assembly.

It is therefore one of the objects of this invention to provide a housing that can be readily and expeditiously associated with a gas supply system and more particularly with the shut off valve thereof, and without necessitating dismantling of any part of the system, and to further provide a housing so constructed that it cannot be pried open without completely disrupting it. In other words, it is among the objects of this invention to provide a housing which, when closed and locked, will absolutely preclude tampering with the operating parts of the valve by unauthorized persons.

In the preferred form of its construction, the housing of this invention comprises a substantially rectangular body provided with an open front and an open bottom. In other words, in the preferred form, it embodies four sides, the other two sides of the box-like structure being normally open. The body of the housing is made in two sections joined in a detachable manner in a plane extending through the axis of the pipe holes formed in the wall of the structure, so that when applying the housing to an installation wherein it is desired to enclose the valve casing, as well as the operating parts of the housing, the sections of the housing may be separated and brought together about the part to be enclosed.

Locks are associated with the respective parts of the casing which may be bolted together to hold the sections in assembled relation. The cover of the housing is substantially L-shape and forms, in practice, the front and bottom of the box. Its cover is flanged and the housing is also flanged, the several flanges of the respective parts being shaped for interfitting relation when slid into cooperative engagement with one another. Locking lugs are provided through which padlocks are adapted to be passed to positively lock the parts together. Through the interfitting relation of the flanges as specified, and the utilization of padlocks or other convenient form of locks, unauthorized persons are precluded from opening the box without substantially demolishing it. In other words, it cannot be readily pried open as is the case with practically all boxes of the prior art.

The structure may be made of sheet metal or as a casting or otherwise, but, in any event, it is relatively simple in construction, may be economically manufactured and is thoroughly efficient in the performance of its intended functions.

Features of the invention, other than those adverted to, will be apparent from the hereinafter detailed description and claims, when read in conjunction with the accompanying drawings.

Figure 1 is a perspective view showing the housing of this invention with the cover removed.

Figure 2 is an end view of the parts assembled.

Figure 5 is a section on the line 5—5 of Figure 1.

Figure 3:
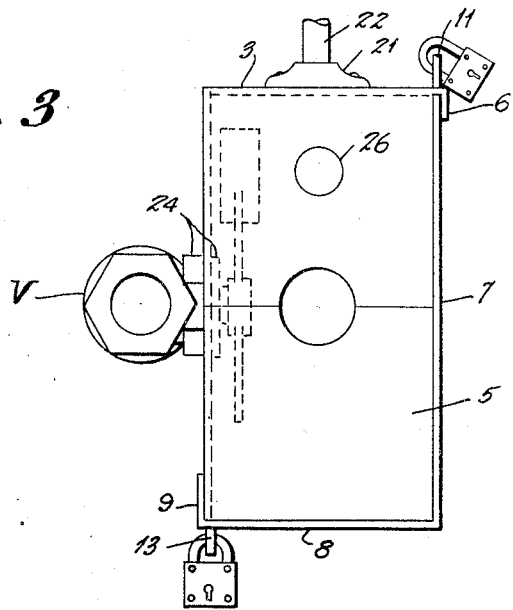
Figures 3 and 4 are views similar to Figure 2, but showing the housing associated with a shut off valve. In the former figure, the valve is exterior of the housing while in the latter figure, it is positioned interiorly thereof.

The housing of this invention embodies a body in the form of a box 1 and a cooperating cover 2. The box is shown as provided with an open front and an open bottom and has a top wall 3, a back wall 4 and end walls 5. The top wall is extended forwardly beyond the front edges of the end walls and flanged downwardly as shown at 6 to overlie the upper margin of the front wall of the cover. The cover is substantially L shaped having a front wall 7 and a bottom 8 and the free edge of the bottom is turned up to provide a flange 9 adapted to overlap the lower margin of the back 4 exteriorly. Thus in associating the cover with the box, the front 7 is placed against the front edges of the side walls 5 with the cover in slightly lowered condition in order that the upper edge of the cover as well as the upper edges of the flanges 9 may clear the flange 6 and the lower edge of the back wall respectively.

If the cover is now slid upwardly, the upper margin of the front wall 7 thereof will enter back of the flange 6 of the box while the flange 9 of the cover will overlap the lower margin of the back 4 of the box.

The top 3 of the box is preferably provided with openings 10 formed in the overhang and the front wall 7 of the cover has perforated extensions 11. These extensions being positioned so that when the cover is slid into the position described the extensions 11 will pass through the openings 10 and padlocks 12 may be thereupon passed through the perforations to lock the cover in position. The back 4 is provided with a depending extension 13 perforated as at 14 and adapted to extend through an opening 13' formed in the bottom 8 of the cover and the yoke of a padlock may be passed through the perforation 14 to further assist in locking the cover in position.

I also preferably provide on the interior of the back 4 and near the lower edge thereof an undercut keeper 15, as shown best in Figures 1 and 5, and provided upon the bottom 8 of the cover a wedge shaped tongue 16 which, when the cover is moved into closed position engages with the keeper, as shown best in Figure 5 to firmly secure the parts together. Additional securing means may be provided by forming lugs 17 on the sides 5 of the box and on the interior thereof and providing hook shaped keepers 18 on the front wall 7 of the cover to be engaged with one another when the cover is brought into closed position.

The box of the present invention is preferably made in two sections with openings 19 at the line of parting of the sections, as clearly shown in Figure 1. These sections may be provided with knock-out pieces (not shown), such as commonly found in electrical outlet boxes, so that the openings will be closed unless the fragile sealing disks are knocked out. Other holes 20 may be formed in other portions of the box and they may be provided with knock outs if desired. The top of the box is provided with an outlet 21 with which a conduit 22 is adapted to be associated and through this conduit the usual operating cable may be passed and secured interiorly of the box to the operating parts of the valve enclosed therein.

The sections of the box are provided with juxtaposed lugs 23 formed on the respective sections and these lugs are bolted together to maintain the sections in assembled relation.

The housing of the present invention may be employed so as to house a valve or merely the operating mechanism thereof. In Figure 3, the valve, designated V, is positioned exteriorly of the housing and the housing is clamped by means of suitable jamb nuts 24 upon the boss of the valve casing through which the valve stem extends. The boss is passed through the opening 20, shown in Figure 1, and the jamb nuts are screwed tightly toward one another to clamp the back wall 4 firmly between them. The housing is mounted in this way rigidly upon the valve casing. The operating mechanism of the valve is secured to that portion of the valve stem which extends beyond the boss and is thus contained wholly within the housing of the present invention.

Figure 4:
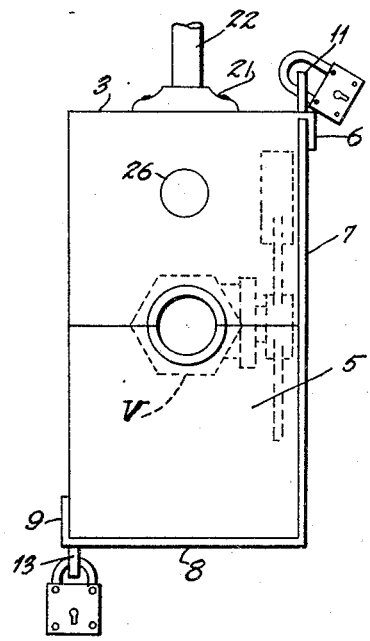

To associate the housing with a valve after the manner shown in Figure 3, the sections of the housing need not be separated. However, when it is desired to enclose a valve casing within the housing, the sections should be separated in order that the housing may be made to enclose a valve as shown in Figure 4. When the cover is removed and the sections of the housing separated from one another, they may be brought to embrace the valve casing and the valve operating mechanism, the sections thereafter being secured together by bolting together the projections 23.

In the assembled relation, the piping connections of the valve extend through the openings 19. Thus, the housing is mounted upon the piping connections to the valve, as shown in Figure 4. It is common in automatic shut-off valves to associate with the operating mechanism a fusible link adapted to be fused when a fire occurs in the vicinity of the device. In order that heat may have ready access into the interior of the box, the cover is preferably perforated, as shown at 25 in Figure 1.

The normal position of the box is horizontal, as shown in the drawings, yet, if desired, it may be tilted at 90 degrees in such installations where the valve is associated with upright pipe connections. When this is the case, the conduit 22 is associated with an opening 26 provided in one end wall 5 of the box.

The box of the present invention may be made of sheet metal or may be cast. In either case, it may be economically manufactured and yet provides a thoroughly efficient structure for its intended purposes. When the cover is in place, its interfitting relation with the box is such that it is impossible to pry off the cover without disrupting the box. It therefore follows that tampering with the valve operating parts by unauthorized persons is positively precluded. The box is shown as rectangular in the accompanying drawings, but it may be made of other shapes without departing from this invention. Moreover, although relatively few knock-outs are associated with the box as shown, others may be added without departing from this invention. In like manner, other colorable changes may be made as will be apparent to those skilled in the art, and the invention is therefore to be understood as fully commensurate with the appended claims.

Having thus fully described the invention, what I claim as new and desire to secure by Letters Patent is:

1. A housing of the character described embodying a box provided with two open sides and having openings in its walls and comprising a plurality of sections separable through at least two of said openings, a cover for closing the open sides of the box, flanges on the cover and box adapted for interfitting relation when the cover is closed, and means for locking the cover to the box for maintaining the box and cover in interfitted relation.

2. A housing of the character described embodying an open box provided with openings in its walls and comprising a plurality of sections separable through at least two of said openings, a cover provided with extensions adapted to project through cooperating openings in the box when the cover is in closed position, an extension on the box adapted to extend through an opening in the cover when said cover is in closed position, and means for securing the extensions of the box and cover against withdrawal through the associated openings to lock the cover in place.

3. A housing of the character described embodying a box provided with two open sides and having openings in its walls and comprising a plurality of sections separable through at least two of said openings, a cover adapted to close the open sides of the box, flanges on the box and cover to cause interfitting of the box and cover when the cover is in closed position, extensions on the cover and box adapted to extend through openings in the box and cover, respectively, when the cover is closed, and locking devices for securing said extensions against withdrawal from the associated openings.

4. A housing of the character described embodying an open box provided with openings in its walls and comprising a plurality of sections separable through at least two of said openings, an overhanging flange extending beyond the free edge of one wall of the box, a cover adapted for sliding movement into engagement with said overhanging flange, interfitting elements formed on the cover and on the box to engage with one another when the cover is slid into cooperative relation with the overhanging flange of the box, and means for locking the cover against retrograde sliding movement.

5. A housing of the character described embodying an open box provided with openings in its walls and comprising a plurality of sections separable through at least two of said openings, a perforated overhanging flange extending beyond the free edge of one wall of the box, a cover adapted for sliding movement into engagement with said overhanging flange, interfitting elements formed on the cover and on the box to engage with one another when the cover is slid into cooperative relation with the overhanging flange of the box, an extension carried by the cover and extending through the perforation of the overhanging flange, and means associated with said extension for precluding retrograde sliding movement of the cover.

In testimony whereof I have signed the foregoing specification.

HENRY SIEBEN.